(12) United States Patent
Kourous-Harrigan

(10) Patent No.: US 11,396,271 B2
(45) Date of Patent: Jul. 26, 2022

(54) SYSTEM AND METHOD FOR COMMUNICATING BETWEEN AUTONOMOUS VEHICLE AND VULNERABLE ROAD USERS

(71) Applicant: Ford Global Technologies, LLC, Dearborn, MI (US)

(72) Inventor: Helen Elizabeth Kourous-Harrigan, Monroe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 250 days.

(21) Appl. No.: 16/905,348

(22) Filed: Jun. 18, 2020

(65) Prior Publication Data
US 2021/0394705 A1 Dec. 23, 2021

(51) Int. Cl.
| | |
|---|---|
| *G05D 1/00* | (2006.01) |
| *B60R 21/34* | (2011.01) |
| *G06T 19/00* | (2011.01) |
| *H04W 4/44* | (2018.01) |
| *B60W 60/00* | (2020.01) |
| *B60R 21/0132* | (2006.01) |

(52) U.S. Cl.
CPC .......... *B60R 21/34* (2013.01); *B60R 21/0132* (2013.01); *B60W 60/0017* (2020.02); *G06T 19/006* (2013.01); *H04W 4/44* (2018.02); *B60W 2554/4029* (2020.02); *B60W 2554/4047* (2020.02)

(58) Field of Classification Search
CPC ............... B60R 21/34; B60R 21/0132; B60W 60/0017; B60W 2554/4029; B60W 2554/4047; B60W 30/0956; G06T 19/006; H04W 4/44
See application file for complete search history.

(56) References Cited

U.S. PATENT DOCUMENTS

| | | | |
|---|---|---|---|
| 9,421,909 B2 | 8/2016 | Strickland et al. | |
| 10,719,966 B1* | 7/2020 | Davis | G06Q 40/08 |
| 10,733,893 B1* | 8/2020 | Swan | G08G 1/166 |
| 2009/0002197 A1* | 1/2009 | Cemper | G08B 21/22 |
| | | | 340/989 |
| 2011/0001635 A1* | 1/2011 | Akens | G08G 1/04 |
| | | | 340/936 |
| 2012/0265977 A1* | 10/2012 | Ewell, Jr. | G06F 3/012 |
| | | | 713/100 |
| 2014/0004840 A1* | 1/2014 | Ewell, Jr. | G06F 1/3231 |
| | | | 455/418 |

(Continued)

OTHER PUBLICATIONS

Anaya et al., "Vehicle to pedestrian communications for protection of vulnerable road users," IEEE Intelligent Vehicles Symposium Proceedings, Jun. 2014, pp. 1037-1042, doi: 10.1109/IVS, Dearborn (US).

(Continued)

*Primary Examiner* — Munear T Akki
(74) *Attorney, Agent, or Firm* — Brandon Hicks; Eversheds Sutherland (US) LLP

(57) ABSTRACT

The present disclosure relates to a method and system for communication between a vulnerable road user and an autonomous vehicle using augmented reality to highlight information to the vulnerable road user regarding potential interactions between the autonomous vehicle and the vulnerable road user.

19 Claims, 8 Drawing Sheets

(56) References Cited

U.S. PATENT DOCUMENTS

| | | | | |
|---|---|---|---|---|
| 2014/0278053 A1* | 9/2014 | Wu | ................... | G01C 21/3647 |
| | | | | 701/408 |
| 2017/0345292 A1* | 11/2017 | Haran | ................... | G08G 1/166 |
| 2019/0122543 A1* | 4/2019 | Matus | ................. | G08G 1/0133 |
| 2019/0184893 A1 | 6/2019 | Sorokin | | |
| 2020/0160054 A1* | 5/2020 | Rogan | .................... | H04W 4/44 |
| 2021/0078598 A1* | 3/2021 | Kim | .................... | G06K 9/6271 |
| 2021/0092555 A1* | 3/2021 | Mayor | ................. | H04M 1/724 |
| 2021/0389152 A1* | 12/2021 | Beaurepaire | ....... | G01C 21/3635 |

OTHER PUBLICATIONS

Wu et al., "Cars Talk to Phones: A DSRC Based Vehicle-Pedestrian Safety System," IEEE 80th Vehicular Technology Conference (VTC2014-Fall), Sep. 2014, 7 pgs., doi: 10.1109/VTCFall, Vancouver (CA).

Mahadevan et al., "Communicating Awareness and Intent in Autonomous Vehicle-Pedestrian Interaction," Apr. 2018, ACM, 12 pgs, ISBN 978-1-4503-5620, Montreal (CA).

\* cited by examiner

SYSTEM AND METHOD FOR COMMUNICATING BETWEEN AUTONOMOUS VEHICLE AND VULNERABLE ROAD USERS

TECHNICAL FIELD

The present disclosure relates to autonomous vehicles, and more particularly, to communication between autonomous vehicles and vulnerable road users.

BACKGROUND

Vehicles, particularly autonomous vehicles (AVs), may communicate with other electronically connected road users, e.g., pedestrians, bikers, or other vulnerable road users (VRUs) to provide warnings of unsafe conditions. These communications all rely upon the same basic information being conveyed with visual and/or audible transmissions associated with the AV itself, or short messages or vibrations sent to a mobile device of the VRU.

Current methods of communication between a vehicle and the VRU can be limited both in terms of type and content, providing little ability to distinguish and prioritize between a wide range of situations. Intersections between an AV and a VRU may, for example, fall anywhere on the spectrum of minimally invasive intersections to impact events.

Augmented reality (AR) has been used to enhance natural physical environments or situations and offer perceptually enriched user experiences. With the help of advanced AR technologies (e.g. adding computer vision, incorporating AR cameras into smartphone applications and object recognition), user information about one's surrounding world can become interactive and be digitally manipulated. In augmented reality, virtual information is overlaid onto real world objects and environments. The augmented information can be fictionalized or may be based in reality, e.g. "seeing" other sensed or measured information such as electromagnetic radio waves aligned in their natural locations.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the Figures are not necessarily drawn to scale. Throughout this disclosure, depending on the context, singular and plural terminology may be used interchangeably.

DETAILED DESCRIPTION

Overview

Figure 1:
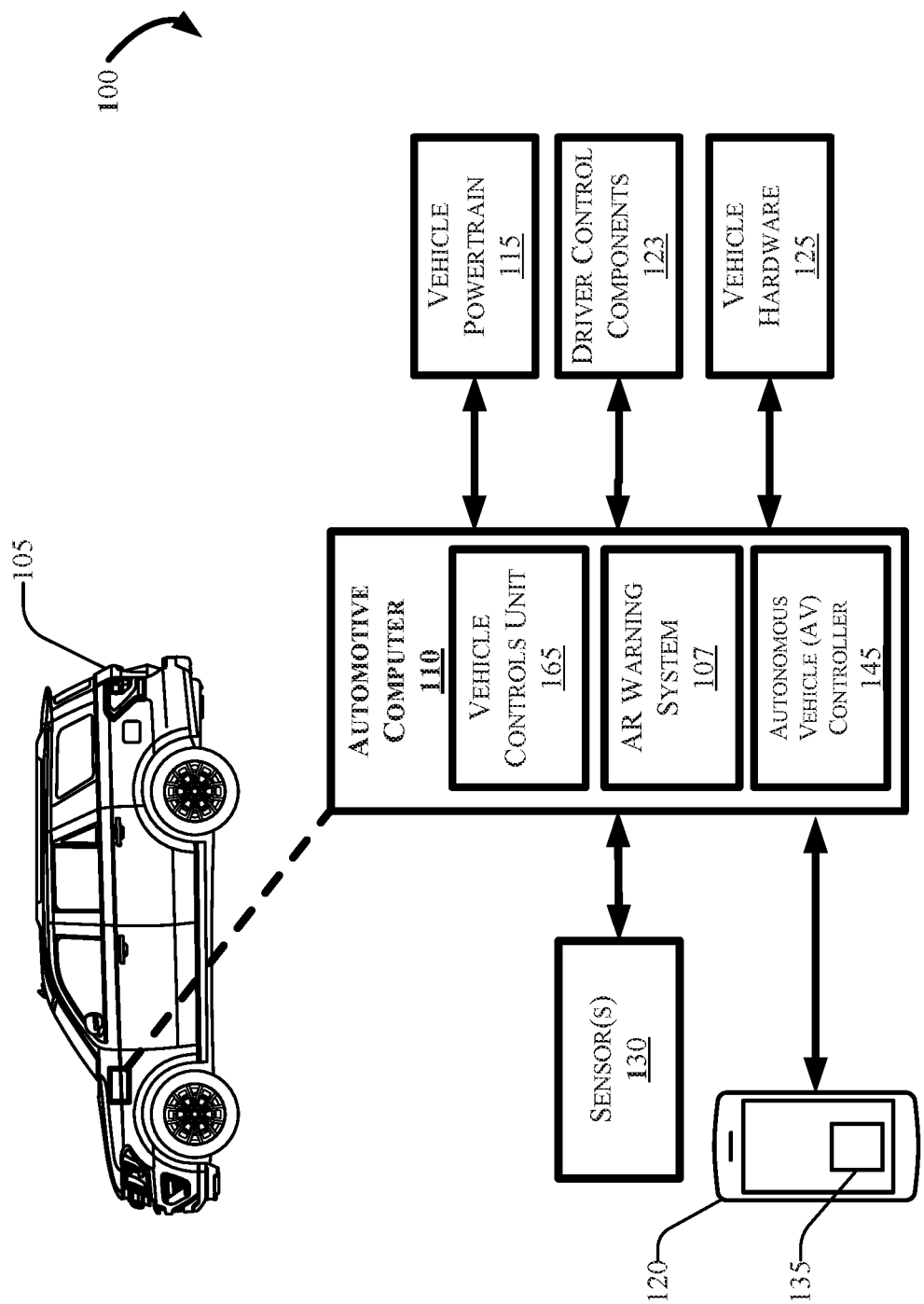
FIG. 1 illustrates an exemplary AV in communication with a VRU in accordance with the present disclosure.

The systems and methods disclosed herein are configured and/or programmed to allow communication between an autonomous vehicle (AV) and a vulnerable roadway user (VRU). The communication includes a mobile device display using augmented reality (AR).

A VRU may be, according to described embodiments, a pedestrian, bicyclist, individual mobility vehicle user (e.g., a motorcycle, scooter or the like), or another user that may be severely disadvantaged if involved in a collision with an AV or another vehicle. The VRU may, in some aspects, carry on their person and/or otherwise operate a mobile device instantiating an application configured and/or programmed to interact with nearby vehicles, receive map information, and provide information to the VRU that may assist the user in avoiding harmful collision events with the vehicles. Accordingly, the system described in the present disclosure may include the mobile device, which may be associated with the VRU, and adapted for communication with an AV or other vehicle configured and/or programmed to work with the AR systems described herein as the VRU utilizes roadways and sidewalks the same as or proximate to the vehicles.

In some aspects, the AR system can determine whether an AV is proximate to the VRU, for example as the VRU approaches an intersection or crosswalk. The AV may broadcast the vehicle trajectory in global map coordinates, such as a series of waypoints described in closely space latitude/longitude pairs. The mobile device may interpret and overlay onto the latitude/longitude pairs to determine whether the vehicle intends to stop at the intersection of a pedestrian crosswalk. The AV can send its navigational intent to the VRU by providing an image or camera frame of the currently proximate roadway to the mobile device, and accessing a map of the roadway on the mobile device, which may be retrieved from a municipal source and/or from a third-party database, e.g., Google® maps, Apple® Maps, etc. Based upon the navigational intent information, the AV can display instructions and other information overlaid on the camera image shown on the mobile device display using an AR overlay. Depending upon the seriousness of the information to be conveyed to the VRU, the AR overlay may utilize graphics, colors, sounds, etc. making it easier for the VRU to avoid dangerous interactions with the AV. By computing the coordinate transform from global coordinates to roadway image (e.g., the camera frame) coordinates, the mobile device can project the virtual path of the AV on a representation of a map lane onto the image viewed by the vulnerable road user, such that the two representations overlap in an easily human-interpretable way.

In one exemplary embodiment, the method of the present disclosure warns a VRU of imminent physical impact and prevents such an event between the AV and the VRU by altering the intended path of one or both parties.

These and other advantages of the present disclosure are provided in greater detail herein.

Illustrative Embodiments

The disclosure will be described more fully hereinafter with reference to the accompanying drawings, in which exemplary embodiments of the disclosure are shown, are not intended to be limiting.

In the present disclosure, Applicants present systems, devices, and methods that can provide improved communication between an autonomous vehicle and a mobile device of a VRU, through the application of AR.

Vehicles provide a significant portion of transportation for commercial, government, and private entities. Autonomous vehicles and driving assistance systems are currently being developed and deployed to improve safety, reduce an amount of user input required, or even eliminate user involvement entirely. For example, some driving assistance systems, such as crash avoidance systems, may monitor driving, positions, and velocity of the vehicle in relation to other objects while a human is driving. When the system detects that a crash or impact is imminent the crash avoidance system of the driving assistance system may intervene and apply a brake, steer the vehicle, or perform other avoidance or safety maneuvers. As another example, autonomous vehicles may drive and navigate a vehicle with little or no user input. However, due to the dangers involved in driving and the costs of vehicles, it is extremely important that autonomous vehicles and driving assistance systems operate safely and avoid impacts with other vehicles and pedestrians.

A first aspect of this disclosure relates to an autonomous vehicle. In this regard, the vehicle may be configured and/or programmed to operate in a fully autonomous (e.g., driverless) mode (e.g., level-5 autonomy) or in one or more partial autonomy modes. Examples of partial autonomy modes are widely understood in the art as autonomy Levels 1 through 5. An autonomous vehicle (AV) having Level-1 autonomy may generally include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. Level-3 autonomy in a vehicle can generally provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 autonomy includes vehicles having high levels of autonomy that can operate independently from a human driver, but still include human controls for override operation. Level-4 automation may also enable a self-driving mode to intervene responsive to a predefined conditional trigger, such as a road hazard or a system failure. Level-5 autonomy is associated with autonomous vehicle systems that require no human input for operation, and generally do not include human operational driving controls. Finally, it is within the scope of this disclosure that the vehicle may be manually driven.

The autonomous vehicle may take the form of any passenger or commercial automobile such as, for example, a car, a truck, a sport utility, a crossover vehicle, a van, a minivan, a taxi, a bus, etc., and may be configured and/or programmed to include various types of automotive drive systems. Exemplary drive systems can include various types of internal combustion engine (ICE) powertrains having a gasoline, diesel, or natural gas-powered combustion engine with conventional drive components such as, a transmission, a drive shaft, a differential, etc. In another configuration, the vehicle may be configured as an electric vehicle (EV). In this configuration, the vehicle may include a battery EV (BEV) drive system, or be configured as a hybrid EV (HEV) having an independent onboard powerplant, a plug-in HEV (PHEV) that includes a HEV powertrain connectable to an external power source, and including a parallel or series hybrid powertrain having a combustion engine powerplant and one or more EV drive systems. HEVs can include battery and/or supercapacitor banks for power storage, flywheel power storage systems, or other power generation and storage infrastructure. The vehicle may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

As recognized in this field, autonomous vehicles include many computing systems, most of which do not play a role in the communication method of this disclosure. Thus, this disclosure will describe the relevant aspects of the AV computer systems which play a role in the disclosed method. The general details of the wider array of AV computing systems are known in the art and are not discussed in detail here.

FIG. 1 illustrates a functional schematic of an example architecture of an automotive control system 100 that may be used for control of a vehicle 105, in accordance with the present disclosure. The automotive computer system 110 may include the vehicle control unit 165 which may be disposed in communication with the autonomous vehicle controller 145, the augmented reality warning system 107, and the vehicle control hardware including, for example, a vehicle powertrain 115, one or more driver control components 123, vehicle hardware 125, one or more sensor(s) 130, and other components not shown in FIG. 1. The automotive computer 110 may be in communication with a mobile device 120 including an application 135.

Driving sensors 130 may include any number of devices configured or programmed to generate signals that help navigate the vehicle while the vehicle is operating in the autonomous (e.g., driverless) mode. Examples of autonomous driving sensors may include a Radio Detection and Ranging (RADAR or "radar") sensor configured for detection and localization of objects using radio waves, a Light Detecting and Ranging (LiDAR or "lidar") sensor, a vision sensor system having trajectory, obstacle detection, object classification, augmented reality, and/or other capabilities, and/or the like. The autonomous driving sensor(s) 130 may help the vehicle "see" the roadway and the vehicle surroundings and/or negotiate various obstacles while the vehicle is operating in the autonomous mode.

The vehicle 105 may include a localization system (not shown in FIG. 1) that may be configured and/or programmed to determine a position of the vehicle 105 at any point in time. The localization system may include a Global Positioning System (GPS) receiver (not shown in FIG. 1) that may be configured or programmed to triangulate a position of the vehicle 105 relative to high definition maps associated with satellite or terrestrial based transmitter towers (not shown in FIG. 1). The AV controller 145 may compare current sensor data to the high definition map data, and generate a trajectory internally as part of its path planning. Accordingly, the AV controller 145 may broadcast the trajectory for any listening devices, vehicles to interpret the information as part of a wireless network.

In some aspects, the AV controller 145 may be disposed in communication with an AV path planner (not shown in FIG. 1) that may be part of an AV stack. The AV path planner may be configured and/or programmed to carry out impact event predictions with other vehicles on the roadway based on prior map data and current obstacles and road rules, and a current goal (e.g., a waypoint on a map to which the AV is traveling). Accordingly, the AV path planner may determine a predicted or deterministic path for the AV. The AV controller 145 may receive information from the AV path planner, and generate a prediction value indicative that the predicted path for the AV is likely to result in the impact event.

In other aspects, the AV controller 145 may compare the prediction value to a threshold value stored in a computer memory (not shown in FIG. 1), which may include one or more values associated with predicted vehicle maneuvers. In one example, the AV controller 145 may determine that the predicted path for the vehicle 105 is likely to result in the impact event by determining that the prediction value is greater than the threshold value. Determining a likelihood for a collision or impact event can include, in one example, determining a trajectory of a vehicle, determining a vehicle velocity, and evaluating a relative ability for a vehicle to perform avoidance maneuvers such as taking a sharp turn (having a vehicle turn radius within a predetermined range of vehicle turn radii), and/or execute a rapid deceleration maneuver (by bringing the vehicle 105 to a complete or near-stop given a predetermined range of distances). The automotive computer 110 may determine such a likelihood using, for example, a stored data structure having prediction weights associated with observed outcomes given stored vehicle travel characteristics.

Although outside of the scope of the present application, it should be appreciated that predictive engines may be configured and/or programmed to determine a relative predictive weight associated with respective outcomes given combinations of input characteristics, and such predictive engines are well known in the art of real-time context-aware analytics. As an example, a data structure (not shown in FIG. 1) may include correlations between vehicle type, weight, speed, trajectory, stopping distance, turn radius, response time, and other factors. Accordingly, the automotive computer 110 may include one or more such analytical prediction engines, and more particularly, the AV controller 145 may apply such a predictive analytical engine to determine one or more predicted outcomes given inputs that may change with real-time or substantially real-time. The system may apply a machine learning model having such a predictive analytical engine to determine an impact event. The determination may include predicting a future impact event between the AV 105 and the VRU of the mobile device 120, wherein the impact event prediction is based on the broadcast path for the AV 105. In other aspects, the application 135 may be configured and/or programmed to generate the prediction, and perform the analytical steps described herein.

Autonomous vehicles also include communication infrastructures with which the vehicle (e.g., the vehicle 105) may communicate information. Example infrastructures can include DSRC 80211.p or CV2X (vehicular networking), Wi-Fi, Bluetooth, to name a few examples. Other peer-to-peer protocols are contemplated, and thus, the specific technologies for networking described herein are not intended to be limiting.

In addition, autonomous vehicles (e.g., the vehicle 105) can include a communication interface configured or programmed to facilitate wired and/or wireless communication between the components of the vehicle and other devices, such as a remote server, another vehicle or a mobile device when using a vehicle communication protocol. As used herein, a representation of a vehicle protocol is referred to generally as a "vehicle-to-everything communication protocol (V2X)."

Vehicle-to-everything communication protocols (V2X), may include protocols such as the Dedicated Short-Range Communication (DSRC) communication protocol, and cellular V2X (CV2X), and may allow vehicles to receive information from devices such as other vehicles, infrastructure devices and even mobile devices (e.g., the mobile device 120). With such protocols, vehicles enabled with V2X communication can receive information about other vehicles and infrastructure devices that is not necessarily available to human drivers. For example, a human driver may be able to observe that a nearby vehicle is travelling at about the same speed as the AV 105. With V2X communication protocol(s), however, the AV 105 may receive a signal indicating how fast the nearby vehicle is travelling, its specific location, navigational heading, and so on.

V2X communication may be implemented in various ways using pre-allocated communication bands. One such communication band can include, for example, a communication band operating at a 75 MHz spectrum in the 5.9 GHz band, which may be used by Intelligent Transportation Systems (ITS). Vehicles implementing a V2X protocol may use Dedicated Short-Range Communications (DSRC) in the IEEE 802.11p specification, or use one or more Cellular V2X (C-V2X) protocols.

In the context of this disclosure, the AV may communicate with a VRU through the mobile device 120, which the VRU (not shown in FIG. 1) may carry and/or otherwise utilize.

As discussed above, while this disclosure primarily references pedestrians as the VRU, the definition of vulnerable road user is not limited thereto, and can include any person who is not protected inside a vehicle while using the roadways. For example, bicyclists, motorcyclists, scooter riders, etc., may all be examples of VRUs. Moreover, the nature of the roadway and the location of the VRU relative to the roadway is not critical to this method. However, it can be particularly useful in and around intersections and crosswalks in congested traffic areas.

The mobile device 120 can include devices such as a smart phone, a tablet, a smart watch, or a dedicated device having a GPS receiver and a display configured and/or programmed to show AR content, including devices designed explicitly for the V2X communication system.

Mobile devices for use in this disclosure may be disposed in communication with and/or include access to one or more databases having map information. Such a database can be the product of any suitable third party, such as a map application provider, e.g., Google®, a local or national governmental entity for the location in question, and/or map information supplied by the AV 105, and/or a vehicle network associated with an automobile company/manufacturer.

Regardless of the source, the map information can include road data, satellite data, traffic information, and other similar data associated with road data, where such information may be displayed on the mobile device 120 using the application 135, among other applications. As used herein the term "proximate" the VRU refers to areas surrounding the VRU, generally, but not limited to areas that are within the line of sight of the VRU. Accordingly, proximity may be determined based on a radial distance from a device (e.g., the mobile device 120) or a vehicle (e.g., the vehicle 105) to the other. For example, the mobile device 120 may be proximate the vehicle 105 when the mobile device 120 is within a 100-meter distance from the vehicle 105, a 50-meter distance from the vehicle 105, a 2 meter distance from the vehicle, etc. As the system provides safety warnings to VRUs, and more particularly, to the mobile device(s) associated with the VRUs, in one example embodiment, the area proximate the VRU may be about three city blocks. In another example, and under certain circumstances, the area could be larger, for example, a marathon route or within a geo-fenced shopping district or other mapped area. A mapped area refers to a roadway or other travel paths that may be accessed by AVs and/or the VRUs described herein according to embodiments. For example, this technology could be used on city streets or on a golf cart path if the vehicles were autonomous and the area includes VRU connectivity.

Generally, mobile devices 120 may include a camera (not shown in FIG. 1). According to one embodiment, the camera can be employed to capture images of the area proximate the VRU. For example, an application for displaying the camera image information can be programmed to use the camera to provide a visual display of the roadway proximate the VRU.

In practice, this disclosure relates to a method of communication between an AV and a VRU having a mobile device where the VRU is proximate the AV. The AV 105 may recognize that the VRU is in its proximity or vice versa, and the mobile device 120 may generate a request to determine if any AVs (e.g., the AV 105) are nearby. Such a request from the VRU may occur as the VRU approaches a busy roadway, intersection or crosswalk. Once the VRU and AV determine they are proximate one another, the AV 105 may generate data regarding its navigational intent and apply that generated data to a machine learning model to generate information regarding the possibility of an impact event between the AV and the VRU should the VRU enter the roadway. The AV may then transmit the impact information to the mobile device of the VRU. The information received by the mobile device can include one or more of the intended path of the AV, a collision warning, an instruction to stop or change the VRUs intended path, a time to collision calculation, and/or a severity of such an event.

The display of the VRUs' mobile device may be altered through an augmented reality overlay designed to convey the desired information to the VRU at the desired level of urgency. To this end, the AV may broadcast a navigational intent in the form of a trajectory (a series of waypoints in a global coordinate frame), which may include a predicted set of waypoints a few to several seconds in the future. In other aspects, the navigation intent may include information usable by the application 135 to generate one or more directional arrows depicting a planned and/or predicted path of the vehicle 105.

Moreover, the information may include instructions indicative of vehicle intent. For example, the mobile device 120 may utilize the navigational intent to display words and/or phrases, such as "Stop", "I am stopping," or "I am NOT stopping," or "Do Not Cross". The navigational intent may also include information associated with symbols, such as, for example, arrows, "X" marks, or other symbols indicating relative hazards. In another aspect, the navigational intent may include data usable by the application 135 to provide the VRU with mitigating information that can avoid harmful collisions between the VRU and the vehicle 105. For example, the navigational intent may be usable by the mobile device to generate animation(s), as well as warning or alarming colors such as red, or permissive and disarming colors, such as green, to communicate the possible event to the VRU. The application 135 may display the intended path of the AV using graphics, animations, and other indicia such as arrows, lines, flashes, highlights, overlays, etc. In other aspects, the application(s) 135 may further include a time to collision, and/or an urgency of a predicted event using words, animations, colors, and symbolic representations, and/or the like.

As discussed above, one aspect of this disclosure relates to the use of AR in communicating information to the VRU. Augmented reality (AR) broadly relates to an experience of a real-world environment where the objects that reside in the real world are enhanced by computer-generated perceptual information, sometimes across multiple sensory modalities, including visual, auditory, haptic, somatosensory and olfactory. Here, the primary sensory information would be visual and possibly auditory in nature. As used herein "AR overlay" refers to any digital information that is interposed between the VRU, and the map display and/or camera of the mobile device.

The overlaid sensory information can be constructive (i.e. additive to the natural environment), or destructive (i.e. masking of the natural environment). This experience is seamlessly interwoven with the physical world such that it is perceived as an immersive aspect of the real-world environment.

Hardware components associated with producing augmented reality are a processor, display, sensors and input devices. Mobile computing devices such as smartphones and tablet computers contain these elements, and typically include a camera and microelectromechanical systems (MEMS) sensors such as an accelerometer, GPS, and solid-state compass, making them suitable AR platforms.

The AR system can utilize an Image Linked Map (ILM) interface, where the current location for the VRU and/or the AV appears on a map for the user to interact with. The information from the AV, for example, can then be overlaid over the current map location.

For example, the automated vehicles can broadcast their immediate intent in the form of a trajectory (a series of waypoints in a global coordinate frame) of a few to several seconds in the future, and a directional arrow depicting the planned path of the vehicle. Similarly, the information in word or symbol form can be overlaid on the camera image output on the display to communicate the situation to the VRU.

The inventive method can further include two-way communication between the AV and the mobile device. In this regard, the mobile device can transmit information regarding the VRU from the mobile device to the AV so that the AV can alter its path to avoid the VRU. For example, the V2X communications system and methods may be applied to the analysis of a pedestrian's path history (e.g., GPS position vs. time). Specific examples of information relating to the VRU that can be communicated to the AV include one or more of location, speed, orientation and navigational intent of the VRU. In one aspect, the device includes GPS positioning capability so that a position of a device (e.g., latitude, longitude, elevation) and trajectory may be communicated to the proximate AV.

The order of communication between the AV and the VRU is not important in the context of this disclosure. That is, the mobile device of the VRU may receive a broadcast from the AV, or in alternative embodiments, initiate contact with the AV before, at the same time as, or after the AV initiates contact with the mobile device of the VRU.

The computation associated with the processing of messages from both the mobile device and the AV in the communication method of this disclosure may further include verification of incoming messages from vehicles, determination of potential impact threats and generation of alerts to warn the user of the mobile device accordingly. Verification may include one or more safeguards to prevent or identify false reporting (e.g., a pedestrian on a bus) or to verify the authenticity of a message to prevent tampering with messages or the broadcasting of malevolent messages. To this end, verification may be achieved by verifying each message's authenticity, every other message's authenticity, or every tenth message's authenticity (e.g., 10% random sampling).

Referring to FIGS. 2-6, a method according to this disclosure is illustrated.

Figure 2:
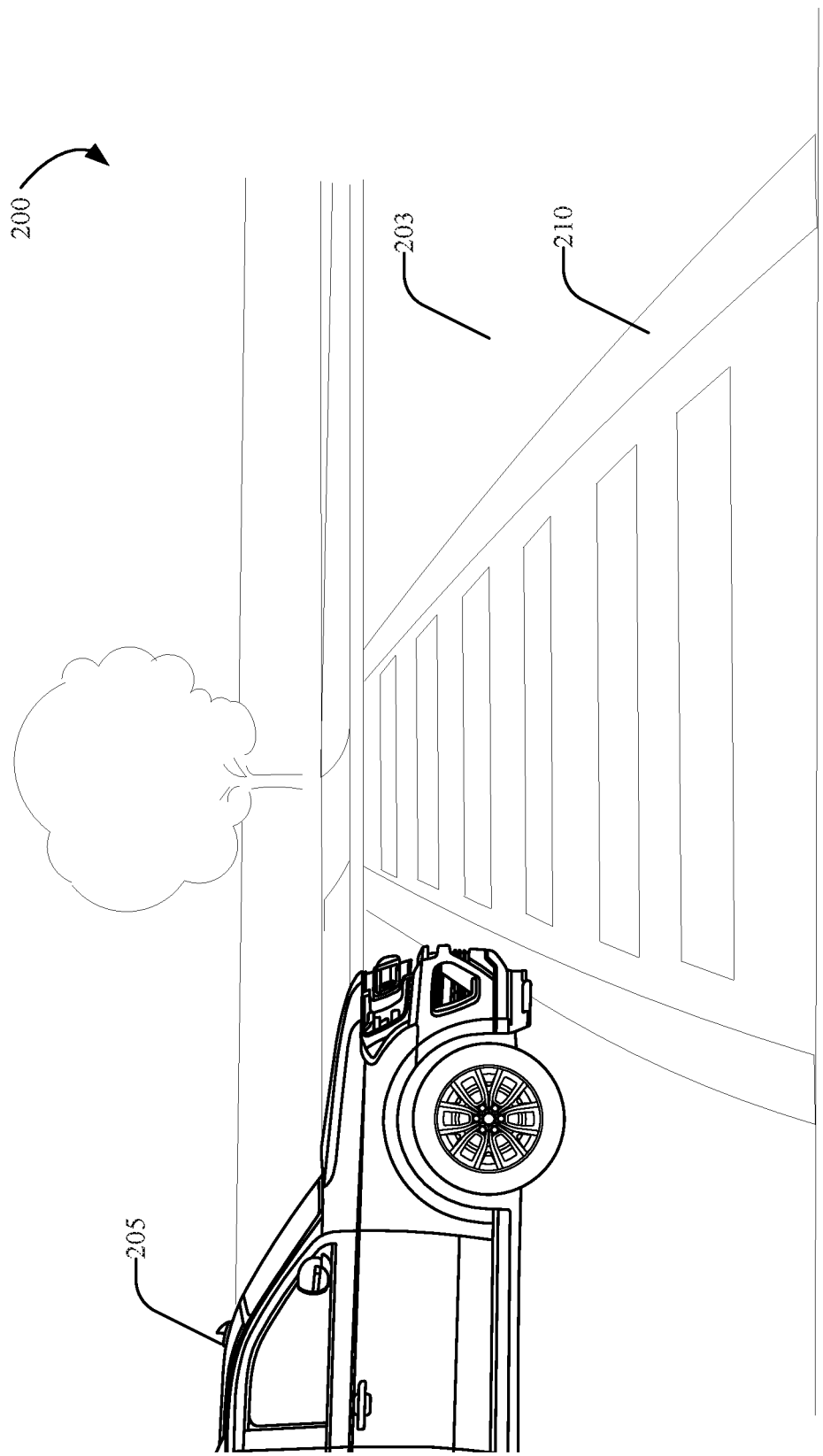
FIG. 2 illustrates a traffic scenario, specifically a crosswalk.

FIG. 2 illustrates a view 200 of a roadway 203 in a vicinity of a VRU (not shown in FIG. 2). As can be seen, the image shows a vehicle 205 approaching a crosswalk 210.

Figure 3:
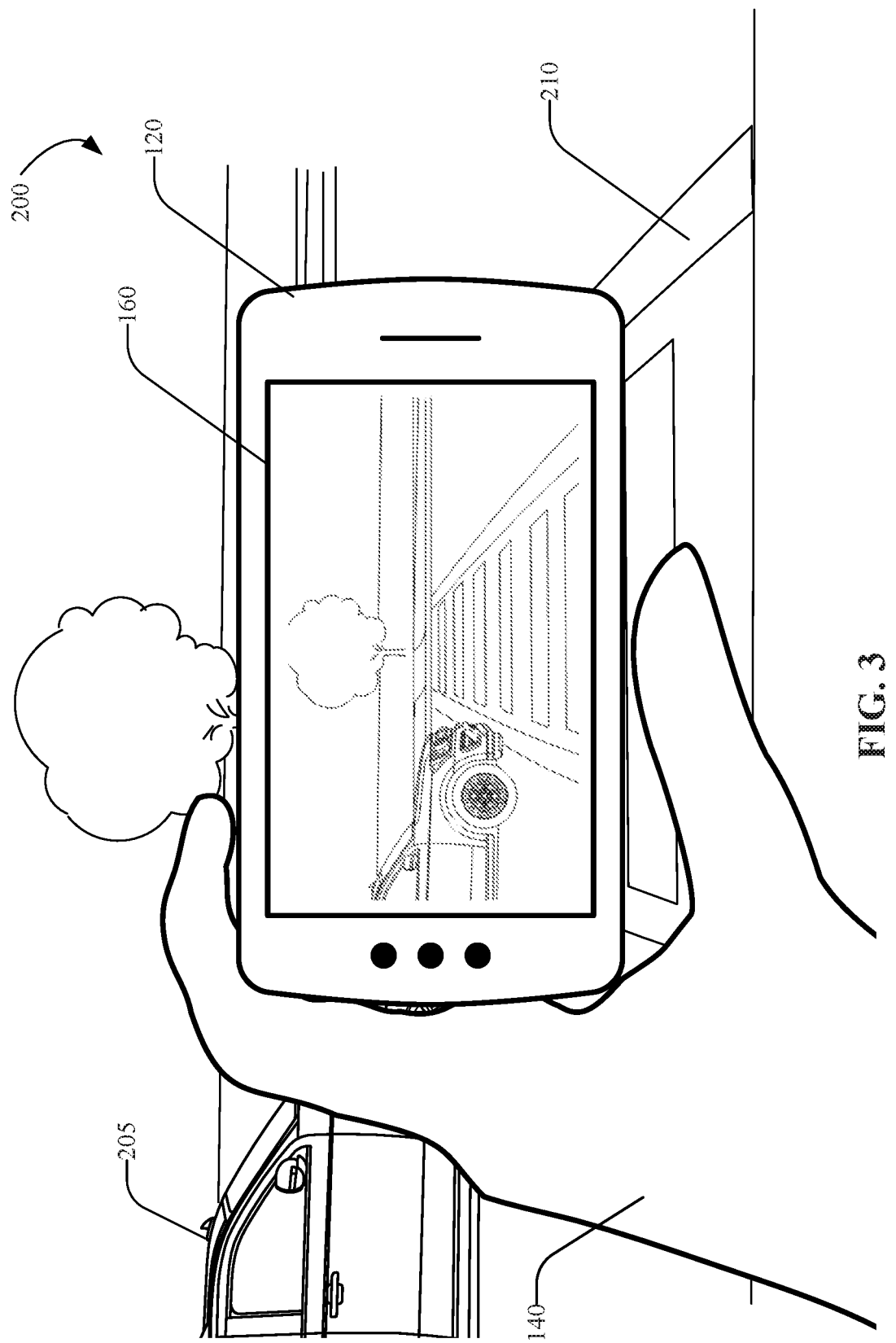
FIG. 3 illustrates the traffic scenario of FIG. 2 on a mobile device display of a VRU.

FIG. 3 illustrates the same view 200 of the roadway 203, in the vicinity of a VRU 140 having a V2X enabled mobile device 120. As can be seen, the mobile device 120 includes a display 160 that may be configured and/or programmed to display the reality of the vehicle 205 approaching the crosswalk immediately in front of the VRU 140 holding the mobile device 120.

Figure 4:
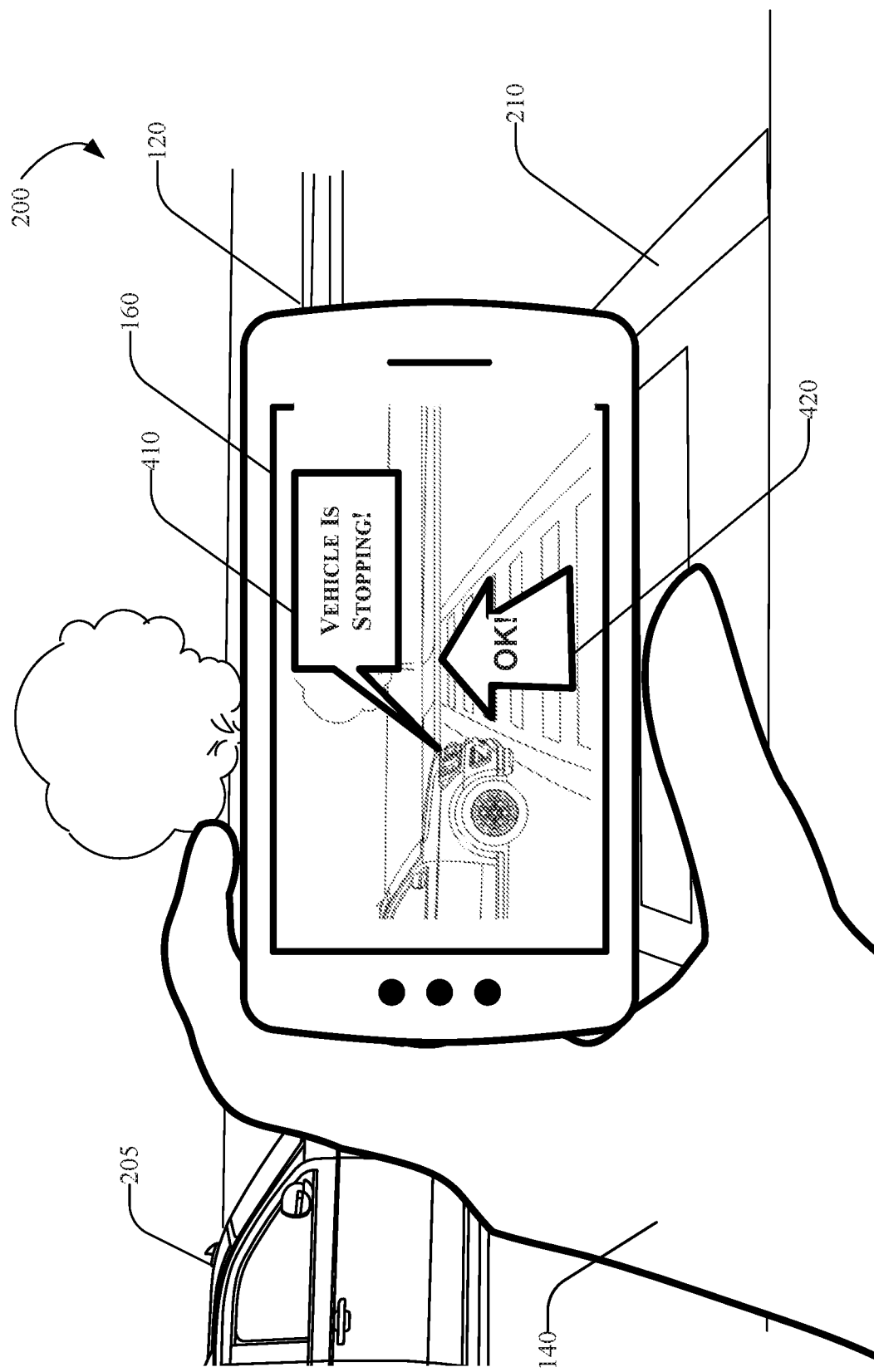
FIG. 4 illustrates an augmented reality scenario according to one embodiment that may be displayed to a VRU with a mobile device display.
Figure 5:
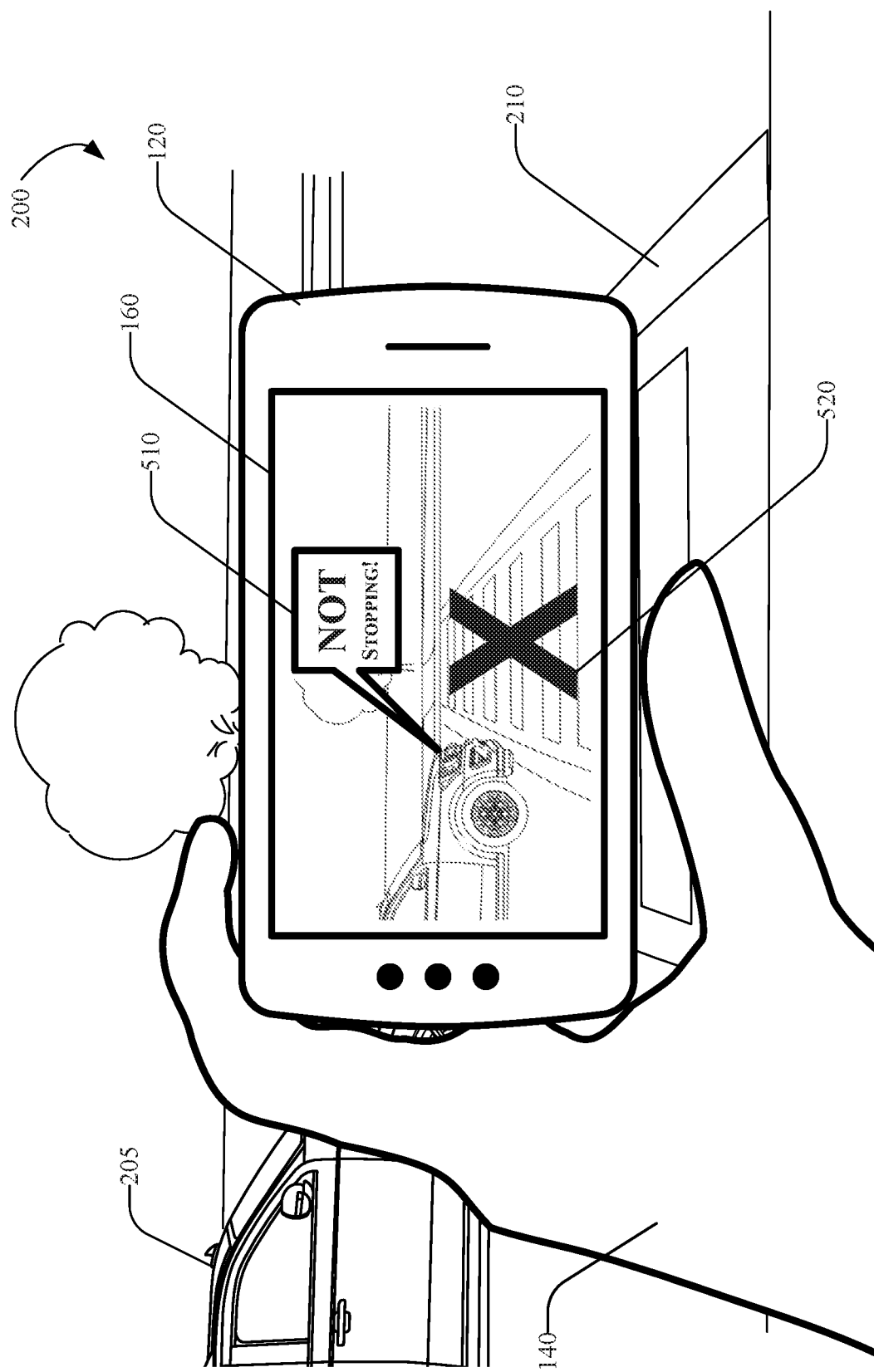
FIG. 5 illustrates an augmented reality scenario according to another embodiment that may be displayed to a VRU with a mobile device display.

FIGS. 4 and 5 depict images of the same scenario including the mobile device 120 (from FIGS. 2 and 3). As seen in FIG. 4, the mobile device display 160 shows the reality of the vehicle 205 approaching the crosswalk immediately in front of the VRU 140 holding the mobile device 120. The mobile device 120 is depicted in FIG. 5 executing the application(s) 135, which includes an AR overlay 400. The AR overlay 400 includes the street scene in real time, over which the AR messages 410 and 420 are displayed. For example, the AR messages 410 and 420 may include written messages that can provide an indication of a predicted vehicle path for the vehicle 205.

In one example, the message 410 provides an indication that "Vehicle is Stopping" 410, which may provide a positive confirmation that the vehicle 205, and more particularly, the AR controller that provides drive instructions for the vehicle 205, has indicated to the mobile device 120 that the vehicle 205 is stopping prior to reaching the crosswalk 210. In another aspect, the message 420 may include one or more symbols, such as an arrow having a disarming color associated with a safe condition for the VRU to pass in front of the stopped AV 205 on the crosswalk 210. In an example embodiment, the message 420 may include a green arrow with the word "ok" appearing therein. Both messages 410 and 420 are depicted in FIG. 4 as communicating that the vehicle 205 is stopping, or intends to stop, at the crosswalk 210, and thus, it is safe for the VRU 140 to intersect paths with the stopped AV 205. It should be appreciated that particular symbols, colors, and other indicia are provided as examples of an embodiment, and thus, are not considered limiting or exhaustive in nature. Other symbolic representations, colors, animations, etc., are possible, and such indicia are contemplated herein.

FIG. 5 depicts another example scenario according to an embodiment. As shown in FIG. 5, the same scene 200 depicts the vehicle 205 providing an indication that it will not be stopping at the crosswalk 210. In this image, the AR overlay is again two written messages, "[I AM] NOT STOPPING" 510 and a symbol of a large X (for example, colored red) 520. Both warning messages 510 and 520 from the vehicle 205 communicate to the VRU 140 that the user should not enter the roadway. The size and nature of the message can be selected to communicate, for example, urgency of the message, the time of possible impact, and the severity of the impact. The AR overlay of FIG. 5 might, for example, further include one or more auditory warnings to the VRU 140. An example of an auditory warning may be a beep, an alarm, or a verbal warning. In another example, the mobile device 120 may provide haptic feedback.

Figure 6:
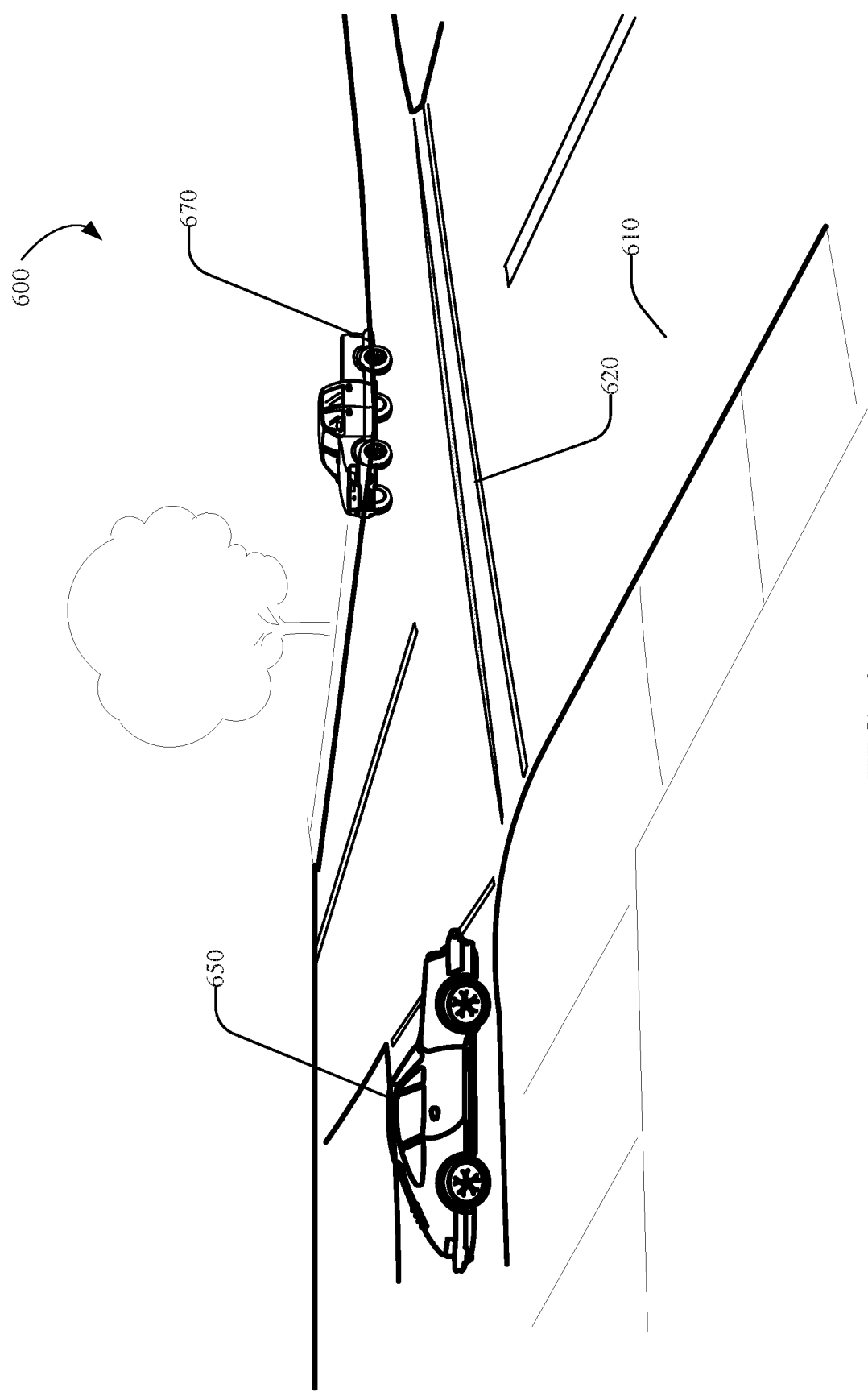
FIG. 6 illustrates a traffic scenario, specifically a traffic intersection.

FIG. 6 illustrates a scenario 600 including a traffic intersection 620 with an approaching vehicle 650 and an approaching AV 670, that may be turning left towards the VRU (not shown in FIG. 6) walking on a sidewalk proximate the roadway 610 with the intent to traverse the intersection 620.

Figure 7:
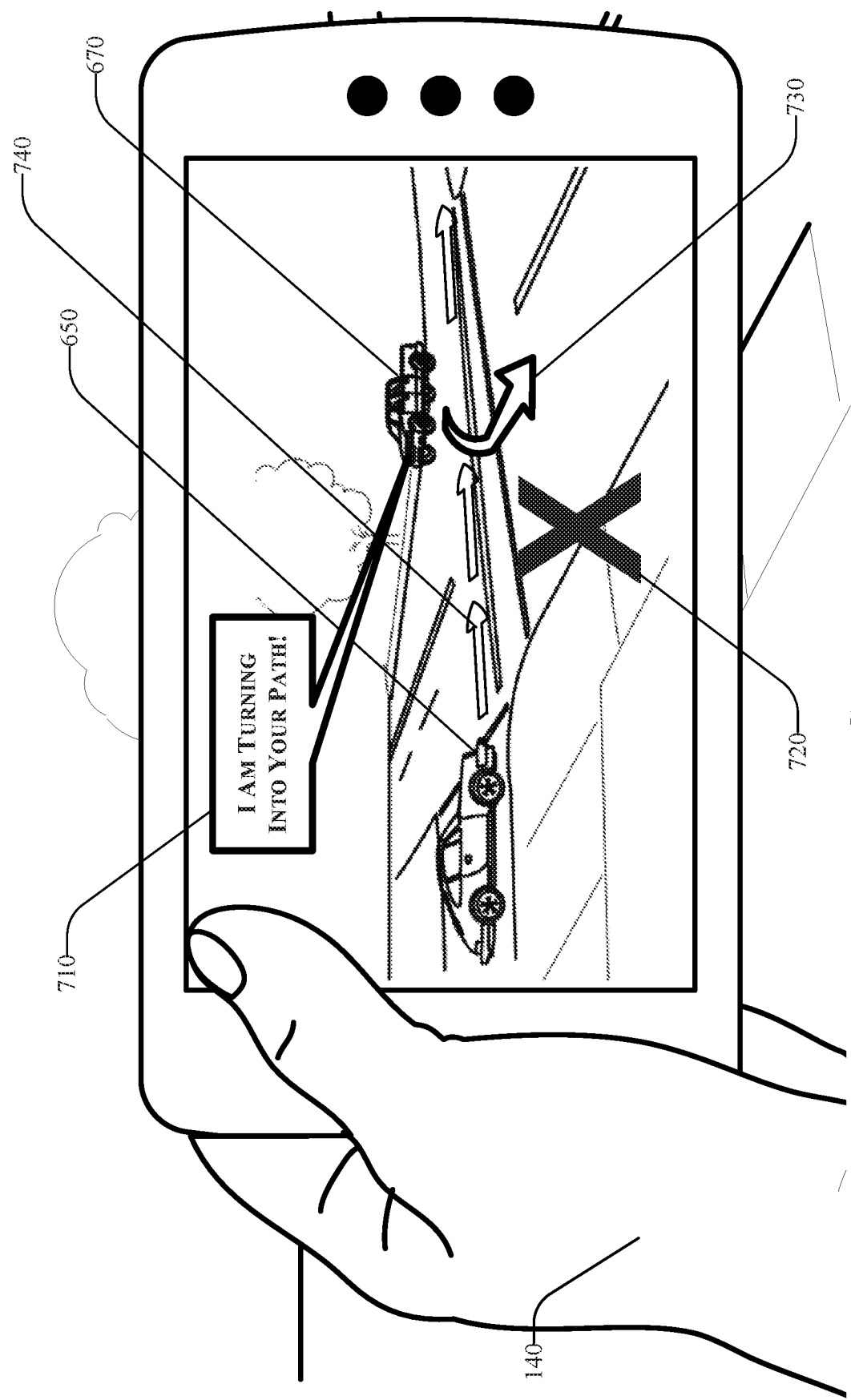
FIG. 7 illustrates the traffic intersection scenario of FIG. 6 displayed to a VRU with a mobile device display including an augmented reality overlay according to yet another embodiment.

FIG. 7 illustrates the same scene as seen in FIG. 6, where the mobile device display shows the reality (e.g., a real-time or substantially real-time view) of the vehicles 650 and 670 approaching the intersection 620 immediately in front of the VRU 140 holding the mobile device 120 (not shown in FIG. 7). The AV 670 has generated an AR overlay of four indications 710, 720, 730 and 740, which may, either individually or in conjunction with one another, warn the VRU 140 regarding the navigational path of the AV 670 and the vehicle 650. In this image, the AR overlay provides a series of arrows 740 showing the navigation path of the vehicle 650, a turn arrow 730 showing the navigational path of the AV 670, a statement 710 by the AV 670 indicating that he will be turning into the path of the approaching VRU 140, and displaying a large X (for example, red or flashing) indicating it is not safe for the VRU 140 to enter the intersection 620. Again, the size and nature of these messages are provided as one possible example, and thus, are not limiting to embodiments of this disclosure. In particular, the indications 710, 720, 730, and 740 may be specifically selected such that they are likely to communicate an urgency of the situation, and/or indicate an imminent collision between the VRU 140 and the AV 670. In the scenario of FIG. 7, the AR overlay may further include one or more other visual, auditory, haptic, or other warnings to the VRU 140.

Figure 8:
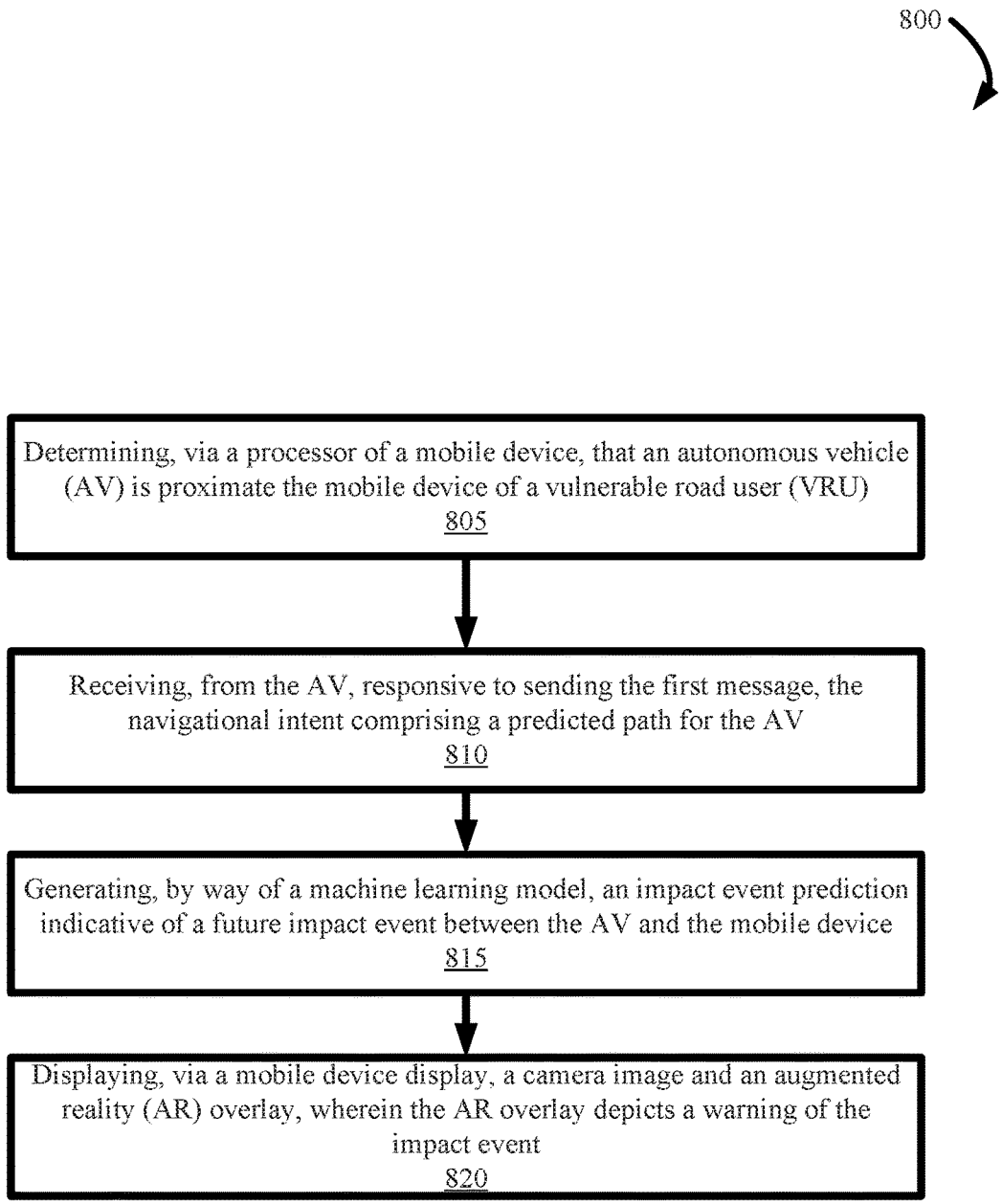
FIG. 8 is a flow diagram illustrating one embodiment according to the disclosure.

FIG. 8 is a flow chart illustrating an exemplary embodiment of the disclosure. As seen in FIG. 8, the first step 805 in the method is to determine, via a processor of a mobile device, that an autonomous vehicle (AV) is proximate the mobile device of a vulnerable road user. The AV may broadcast information indicating the navigational intent that can include a predicted (or planned) trajectory of the vehicle. The mobile device receives the navigational intent from the AV including a predicted path for the AV at step 810. At step 815, the mobile device displays an image of the scene through the AR overlay, where the AR overlay depicts a representation warning of the future impact event.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A computer-implemented method for communicating between a mobile device of a vulnerable road user (VRU) and an autonomous vehicle (AV), the method comprising:
   determining, via a processor of the mobile device, that the AV is proximate the mobile device of the VRU;
   receiving, by the processor of the mobile device from the AV, navigational intent comprising a predicted path for the AV on a roadway;
   generating, by the processor of the mobile device, an impact event prediction indicative of a future impact event between the AV and the mobile device of the VRU, wherein the impact event prediction is based on the predicted path for the AV; and
   displaying, via a mobile device display, a camera image of the roadway and an augmented reality (AR) overlay, wherein the AR overlay depicts a representation of the future impact event.

2. The method according to claim 1, wherein generating the impact event prediction comprises:
   determining, using a threshold value for comparison, that the predicted path for the AV is likely to result in the future impact event between the AV and the VRU; and
   determining a time to collision value using the predicted path for the AV and a location of the mobile device, responsive to determining that the predicted path for the AV is likely to result in the future impact event given the proximity of the VRU.

3. The method according to claim 1, further comprising:
   generating a value indicative of a severity of the future impact event; and
   displaying the AR overlay on the mobile device of the VRU through the AR overlay, wherein displaying comprises animating a graphic associated with the severity of the future impact event.

4. The method according to claim 3, further comprising:
   determining, via the processor of the mobile device, a recommendation; and
   generating the recommendation via the AR overlay.

5. The method according to claim 4, further comprising:
   transmitting, to the AV, a second message comprising a path alteration instruction for altering the predicted path of the AV, wherein the instruction is configured to cause the AV to mitigate or avoid the future impact event.

6. The method according to claim 5, wherein the path alteration instruction comprises an instruction for altering at least one of a vehicle speed and a vehicle direction of the AV.

7. The method according to claim 1, further comprising:
   receiving map data from a map provider database at the mobile device; and
   displaying the AR overlay on the mobile device through the AR overlay, wherein the AR overlay is based on the map provider data.

8. The method according to claim 7, wherein the map provider database is associated with an AV fleet comprising a fleet of autonomous vehicles.

9. The method according to claim 7, wherein the map provider database is associated with a municipal map provider.

10. The method according to claim 7, further comprising:
    augmenting, via the processor of the mobile device, the map data; and
    displaying augmented map data on the mobile device of the VRU through the AR overlay.

11. The method according to claim 10, wherein augmenting the map data comprises:

generating a graphic on the mobile device depicting the map, a representation of the predicted path for the AV, and the AR overlay depicting the future impact event.

12. A system for communicating between a mobile device of a vulnerable road user (VRU) and an autonomous vehicle (AV), the system comprising:
a processor; and
a memory for storing computer-executable instructions, the processor programmed to execute the instructions to:
determine that an autonomous vehicle (AV) on a roadway is proximate the mobile device;
determine a navigational intent of the AV comprising a predicted path for the AV;
generate an impact event prediction indicative of a potential future impact event between the AV and the mobile device, wherein the impact event prediction is based on the predicted path for the AV; and
display, via a display, a camera image of the roadway and an augmented reality (AR) overlay, wherein the AR overlay depicts a representation of the potential future impact event.

13. The system of claim 12, wherein the processor is programmed to generate the impact event prediction by executing an instruction to:
determine, using a threshold value for comparison, that the predicted path for the AV is likely to result in the future impact event; and
determine a time to collision value using the predicted path for the AV and a location of the mobile device, responsive to determining that the predicted path for the AV is likely to result in the future impact event.

14. The system of claim 12, wherein the processor is programmed to generate the impact event prediction by executing an instruction to:
generate a value indicative of a severity of the future impact event; and
display map on the mobile device through the AR overlay, wherein displaying comprises animating a graphic associated with the severity of the potential future impact event.

15. The system of claim 12, wherein the processor is programmed to execute an instruction to:
determine a recommendation; and
generate the recommendation via the AR overlay.

16. The system of claim 15, wherein the processor is programmed to execute an instruction to:
determine a path alteration instruction for altering the predicted path of the AV, wherein the instruction is programmed to cause the AV to mitigate or avoid the potential future impact event.

17. The system of claim 16, wherein the path alteration instruction comprises an instruction for altering at least one of a vehicle speed and a vehicle direction of the AV.

18. The system of claim 12, wherein the processor is programmed to execute an instruction to:
receive map data from a map provider database; and
display the map on the mobile device containing the AR overlay, wherein the map is based on the map provider data.

19. The system of claim 18, wherein the processor is programmed to execute the instruction to:
augment, via the processor of the mobile device, the map data; and
display augmented map data on the mobile device through the AR overlay.

* * * * *